United States Patent [19]

Hoagland et al.

[11] Patent Number: 5,152,550

[45] Date of Patent: Oct. 6, 1992

[54] AIR BAG DEVICE FOR VEHICLES

[75] Inventors: Larry D. Hoagland; Stephen J. Brockman, both of Noblesville, Ind.

[73] Assignee: Ideatech, Inc., Fishers, Ind.

[21] Appl. No.: 741,304

[22] Filed: Aug. 7, 1991

Related U.S. Application Data

[63] Continuation-in-part of Ser. No. 650,679, Feb. 5, 1991.

[51] Int. Cl.$^5$ ............................................. B60R 21/26
[52] U.S. Cl. ........................................ 280/737; 222/5
[58] Field of Search .............. 280/737, 728, 734, 736, 280/741, 742; 180/274; 222/5; 226/267; 137/68.2

[56] References Cited

U.S. PATENT DOCUMENTS

| | | | |
|---|---|---|---|
| 2,691,459 | 10/1954 | Whitmore | 137/68.2 |
| 3,731,843 | 5/1973 | Anderson, Jr. | 280/742 |
| 3,731,948 | 5/1973 | Risko | 280/737 |
| 3,744,816 | 7/1973 | Yamaguchi | 280/737 |
| 3,834,729 | 9/1974 | Oka et al. | 280/737 |
| 3,883,156 | 5/1975 | Frazier | 222/5 |
| 3,913,604 | 10/1975 | Hanson et al. | 137/68.2 |
| 3,966,226 | 6/1976 | Roth | 222/5 |
| 4,135,894 | 1/1979 | Himes | 55/232 |
| 4,275,629 | 6/1981 | McDowell | 83/302 |
| 4,600,123 | 7/1986 | Galbraith | 137/68.2 |
| 5,022,674 | 6/1991 | Frantom | 280/737 |
| 5,076,607 | 12/1991 | Woods et al. | 280/737 |

FOREIGN PATENT DOCUMENTS 1378079 12/1974 United Kingdom ............... 137/68.2

*Primary Examiner*—Karin L. Tyson
*Attorney, Agent, or Firm*—Jack Schuman

[57] ABSTRACT

A safety device is described for use with a vehicle. The device incorporates mechanical cutting means which, in response to a collision, positively cut a seal that fluidally separates a source of pressurized fluid from an air bag. Sensing means are also included which detect a collision and cause the mechanical cutting means to actuate, thus inflating the air bag and protecting occupants of the vehicle. Also described is a manifold which fluidally couples a plurality of sensing means to a plurality of air bags. Upon one or more sensing means detecting a collision, the manifold actuates one or more air bags. A brittle seal, such as tempered glass, is shattered for instantaneous liberation of pressurized fluid. A filter removes debris from the shattered seal.

24 Claims, 13 Drawing Sheets

AIR BAG DEVICE FOR VEHICLES

REFERENCE TO RELATED APPLICATIONS

This application is a continuation-in-part of U.S. patent application Ser. No. 07/650,679, filed on Feb. 5, 1991 and entitled AIR BAG DEVICE FOR VEHICLES having at least one common inventor named in the previously filed application.

BACKGROUND OF THE INVENTION

The present invention relates in general to a safety device and more specifically to a safety device for use with a vehicle.

With the advent of increasingly faster modes of transportation, vehicle manufacturers have increased the amount of protection afforded by a vehicle, both in the number of safety devices and in the sophistication of each safety device. To further encourage vehicle manufacturers to incorporate safety features in their products, the federal government has often promoted safety legislation which mandate varying degrees of safety for vehicles, including automobiles. Among other such mandates as crash resistant bumpers on automobiles and seat belts for passengers in automobiles, current federal legislation has focused on the incorporation of passive restraint devices in automobiles, one such restraint device being an air bag.

Air bags, as passive restraint devices for automobiles, are inflatable during an automobile accident by a source of pressurized fluid. These devices have generally fallen into two categories; inflation from those expansion processes employing reactive or explosive means for inflating, and inflation from expansion processes involving the liberation of pre-pressurized gasses contained within a pressure vessel.

Air bag devices have been developed which pertain to the latter liberation of gasses. Two such devices by Okada, U.S. Pat. No. 4,203,616 and U.S. Pat. No. 4,289,327, appear to disclose an air bag mechanism with a pre-pressurized canister separated from the air bag by a frangible member. The frangible member is dependent on a pressing lid for support. Upon impact of a vehicle, a mechanism causes the pressing lid to move, thereby allowing pressure within the canister to rupture the frangible member. Another device by Hirbod, U.S. Pat. No. 4,215,878, appears to disclose a bumper-air bag system having three valve mechanisms connected to a vehicle bumper. Movement of the bumper during a collision appears to build up pressure to a level which ruptures a diaphragm and liberates pre-pressurized gasses.

Weman, U.S. Pat. No. 3,927,901, appears to disclose a vehicle air bag system with several air bags all interconnected to a pressurized air tank. Impact causes the generation of a pressure wave within the tank which propagates throughout the tank towards the valves and causes the valves to open, thus inflating an air bag. Hodges, U.S. Pat. No. 2,755,125, Sandor, U.S. Pat. No. 2,931,665, and Lee et al., U.S. Pat. No. 4,258,931, all appear to disclose other air bag devices which inflate an air bag using pre-pressurized air stored in a container.

The above described devices rely on either pressure differential to rupture a seal or pressure-activated valves to release pre-pressurized air stored in a pressure vessel. Because both pressure-ruptureable seals and pressure-activated valves do not positively release air from a storage container, a need exists for an improved safety device for use with a vehicle that employs a positive release mechanism to release a source of pressurized fluid and inflate an air bag.

SUMMARY OF THE INVENTION

A safety device for use with a vehicle is disclosed. The safety device incorporates an inflatable air bag coupled to a source of pressurized fluid. A frangible seal fluidally separates the source of pressurized fluid from the inflatable air bag until a collision occurs. Upon a collision occurring, sensing means for sensing a collision causes mechanical cutting means to positively cut the frangible seal, thereby allowing fluid to flow from the source to the air bag and inflate the air bag.

Also disclosed is a common manifold in conjunction with a plurality of safety devices; the safety devices including a plurality of sensing means, air bags, sources, seals and mechanical cutting means. The manifold is fluidally coupled to a plurality of sensing means through a corresponding plurality of one-way check valves. The manifold is also fluidally coupled to a plurality of mechanical cutting means. Upon one or more sensing means sensing a collision, the manifold receives fluid communication from the sensing means through the check valves. The manifold then transmits fluid communication to one or more mechanical cutting means, thus causing the mechanical cutting means to cut the seals and allow fluids to flow from the sources to the air bags and inflate the air bags.

One object of the present invention is to provide an improved safety device.

Another object of the present invention is to provide an improved safety device for use with a vehicle.

Still another object of the present invention is to provide an improved safety device for use with a vehicle that employs a positive release mechanism to release a source of pressurized fluid and inflate an air bag.

These and other objects, features and advantages of the present invention will become more apparent from the following written description of the preferred embodiments and accompanying figures.

BRIEF DESCRIPTION OF THE DRAWINGS

FIG. 13 is a cross-sectional view of the fourth embodiment taken along line 13—13 in FIG. 11a.

FIG. 14b is a cross-sectional view of the actuator plate of FIG. 14a taken along line 14b—14b of FIG. 14a.

FIG. 14c is a cross-sectional view of the actuator plate of FIG. 14a taken along line 14c—14c of FIG. 14a.

DESCRIPTION OF THE PREFERRED EMBODIMENT

Figure 1:
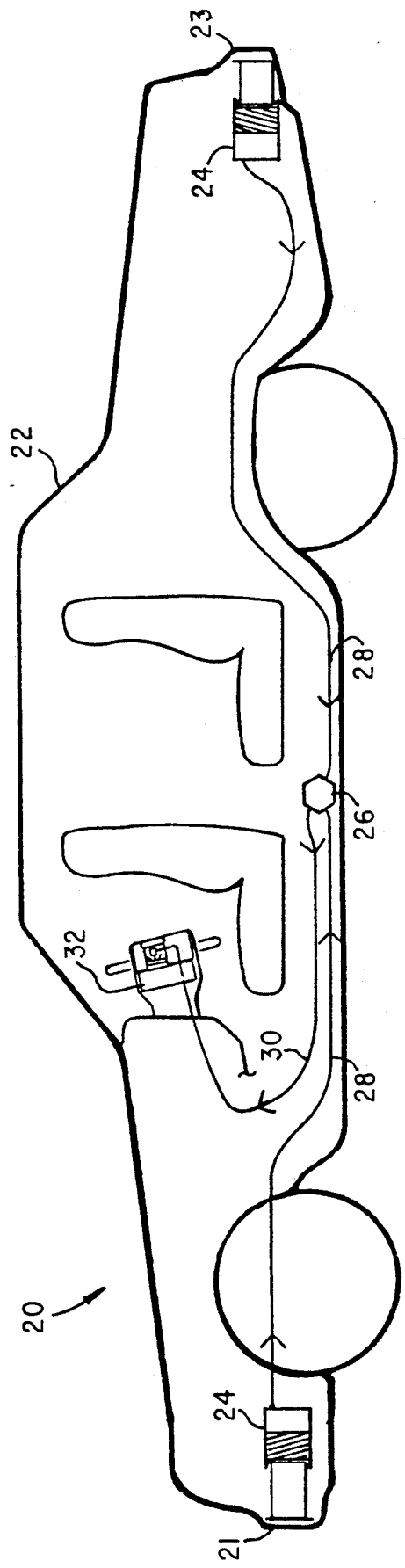
FIG. 1 is a side cut-away view of an embodiment of the present invention installed in an automobile.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and method, and such further applications of the principles of the invention as illustrated therein being contemplated as would normally occur to one skilled in the art to which the invention relates.

An air bag device 20 is shown installed in vehicle 22. Device 20 comprises generally sensing means such as sensor 24 for sensing a collision, a central manifold 26 and an air bag unit 32. Device 20 can be installed in a variety of vehicles, including automobiles. Other road going vehicles are also envisioned, including mass transit vehicles available to the public such as school buses and buses in general. Similarly, other mass transit vehicles contemplated by this invention are subway cars and trains. Also envisioned are installations in vehicles which are not road or rail going, but still provide transport. These vehicles include both ships and planes. The essential point of the invention being that device 20 is adaptable to any vehicle where protection of the vehicle's contents, including human passengers, is desired.

As shown in FIG. 1, sensors 24 are connected to manifold 26 via receiving lines 28. Manifold 26 in turn is connected to air bag unit 32 via transmitting line 30. Sensors 24 are attached to vehicle 22 at locations commonly contacted during a collision. These locations primarily include the front and rear bumpers of vehicle 22, bumpers 21 and 23 respectively. Of course, sensors 24 can be mounted elsewhere on vehicle 22, but sensors 24 are best employed where contact is likely during a collision. Sensors 24 can be contained within front and rear bumpers 21 and 23 respectively, or can extend through or protrude from the front and rear bumpers. If sensors 24 are contained within the bumpers, the bumpers will deform upon a collision to substantially contact one or more sensors 24, thereby actuating air bag unit 32. Similarly, if sensors 24 protrude from bumpers 21 and 23, substantial contact during a collision will cause one or more sensors 24 to actuate air bag unit 32.

Figure 2:
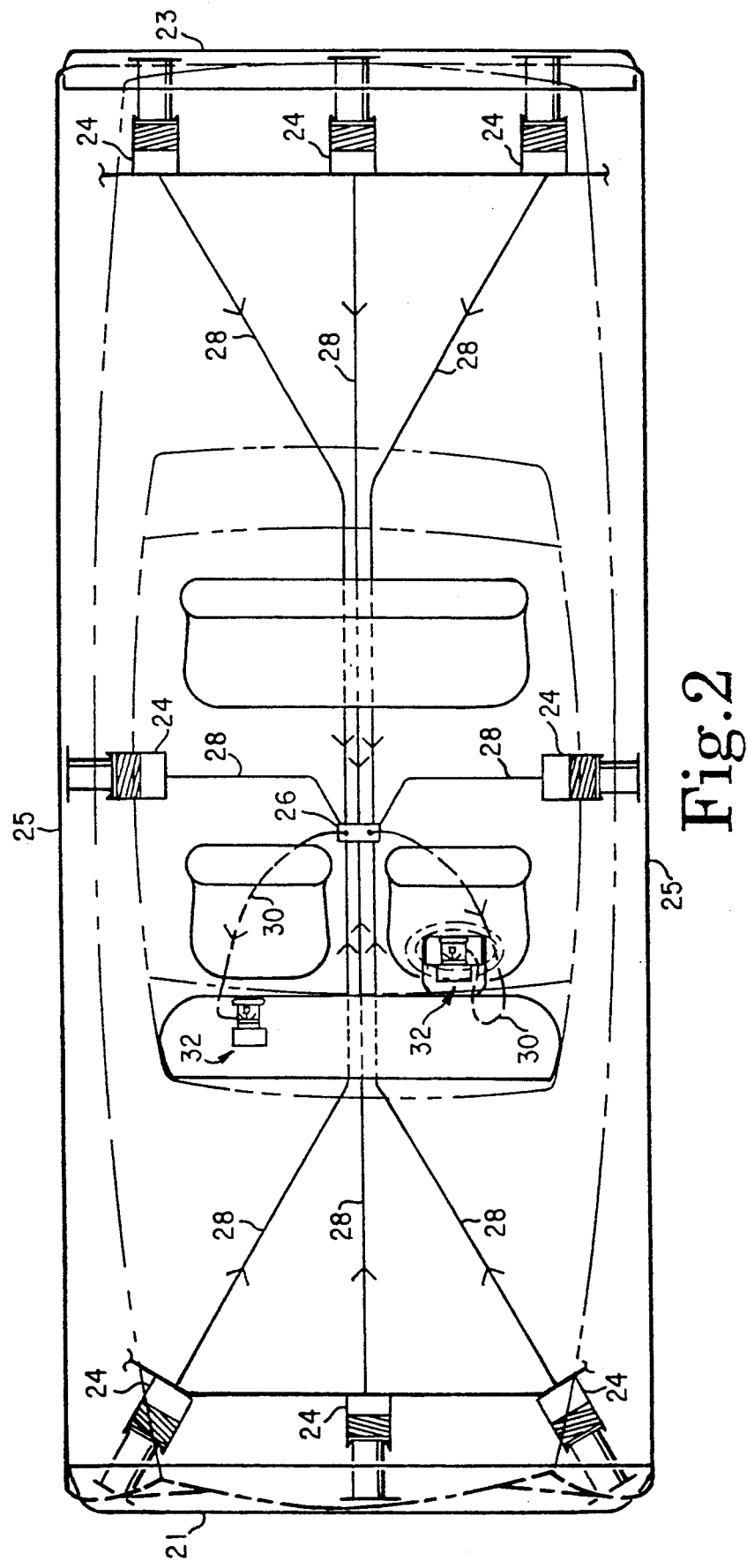
FIG. 2 is a top view of sensors oriented fore and aft and transverse in an automobile.

Furthermore, sensors 24 need not be oriented fore and aft as depicted, but can also be displayed at various angles and orientations as shown in FIG. 2. FIG. 2 depicts sensors 24 mounted normal to bumpers 21 and 23 and at angled corners of bumper 21. Of course, a variety of orientations and quantities of sensors can be employed along the bumpers, the essential requirement being that sensors 24 detect impacts involving bumpers 21 and 23.

Similarly, as previously discussed sensors 24 are not limited to locations along front and rear bumpers 21 and 23, but can include other transverse locations such as sides 25 of vehicle 22. These side locations can include varying heights as well, such as locations beneath a door, within a door pillar, or in a roof pillar of vehicle 22. Sensors 24 can also be oriented vertically along top surfaces of vehicle 22, including front and rear decks and roof. Thus, sensors 24 can be oriented to detect a wide range of collisions involving vehicle 22, including head-on collisions, rear-end collisions, side collisions and roll-over of vehicle 22.

Other sensing means which can detect a collision involving vehicle 22 are also contemplated. These means include but are not limited to electrical contact switches and, motion detectors such as inertial switches and accelerometers. Also, sensors 24 need not be located on vehicle 22. For example, vehicle 22 can incorporate receivers which receive airwave signals from sensors of another vehicle, thereby allowing other vehicles or barriers to trigger air bag unit 32 of vehicle 22.

Referring back to FIG. 1, sensors 24 transmit fluid communication through line 28 to manifold 26. Manifold 26 relays this communication by transmitting a like fluid communication through line 30 to air bag unit 32. Of course, air bag unit 32 can also communicate directly with sensor 24 as well. However, the addition of manifold 26 allows one or more sensors to trigger one or more air bags.

Figure 1A:
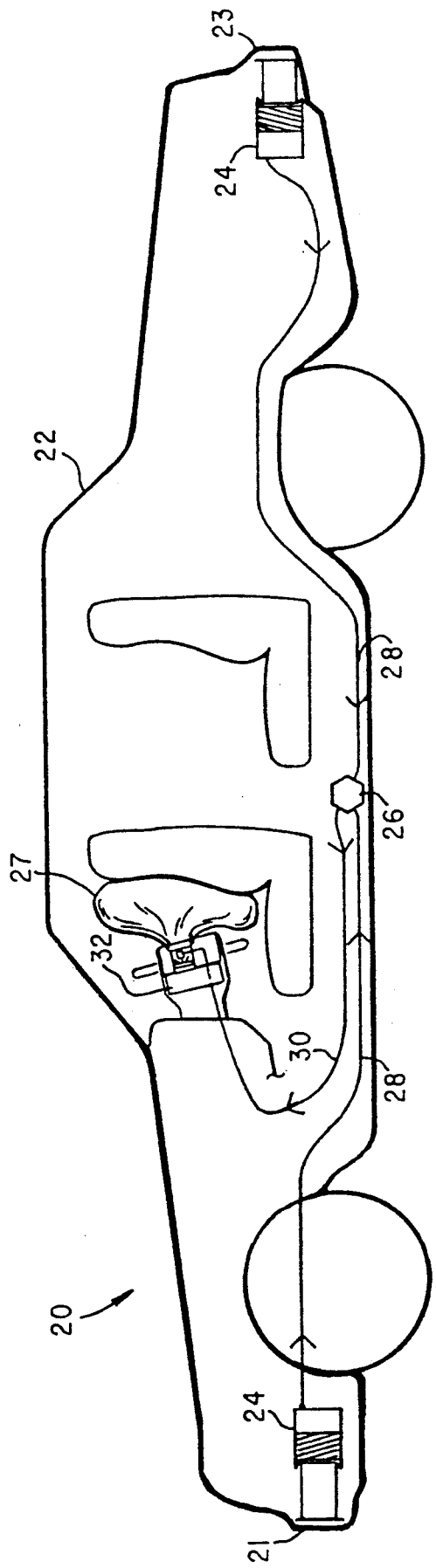
FIG. 1a is a side cut-away view of an embodiment of the present invention installed in an automobile with an air bag actuated.

Air bag unit 32 is responsive to communication from sensor 24 via manifold 26 and upon such communication activates an air bag 27 as shown in FIG. 1a. Air bag 27 is shown inflated in response to sensor 24 of vehicle 22 detecting a collision with a barrier 29. Upon inflating, air bag 27 both restrains and cushions occupants from impact resulting from a collision. As illustrated, air bag unit 32 is installed in a steering column of vehicle 22. This invention also contemplates other installation locations within vehicle 22. These locations include, but are not limited to, door panels, headliners, dashboards, passenger seats, etc., where the essential function of air bag 27 upon inflation is to protect occupants of vehicle 22. "L"-shaped air bags which wrap around interior corners of the vehicle may be used.

Figure 3:
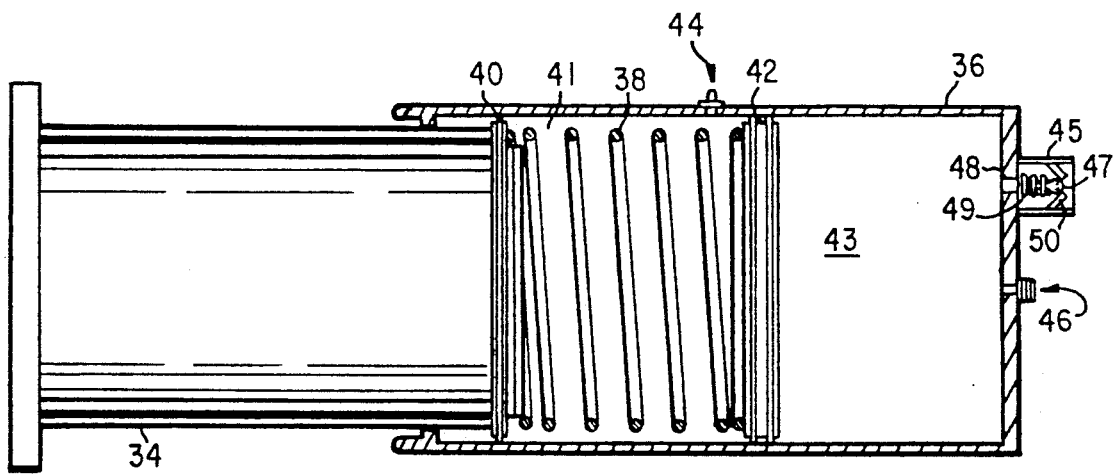
FIG. 3 is a side partial cross-sectional view of a sensor with its piston in a fully extended initial position.
Figure 3A:
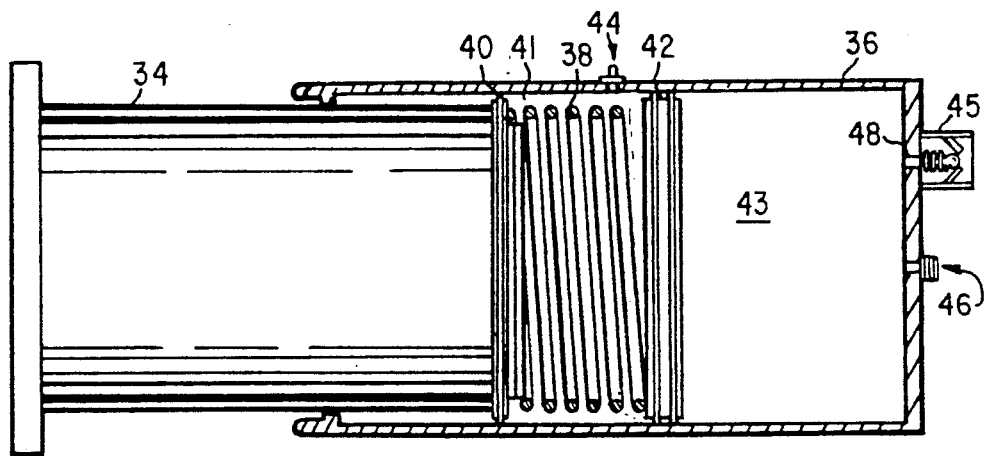
FIG. 3a is a side partial cross-sectional view of a sensor with its piston in a partially extended damping position.
Figure 3B:
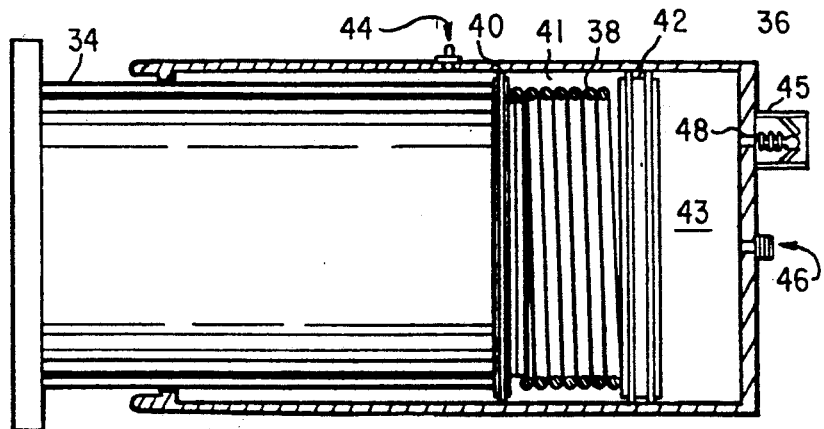
FIG. 3b is a side partial cross-sectional view of a sensor with its piston in a retracted actuating position.

Referring now to FIG. 3, FIG. 3a and FIG. 3b, sensor 24 and its operation are shown in detail. Sensor 24 comprises a fluid cylinder 36 and a piston 34 movable within cylinder 36. Piston 34 has connected to it a spring 38. Piston 34 and spring 38 can be sized to have an outer diameter closely corresponding to the inner diameter or bore of cylinder 36, thereby effectively providing a translatable sealing surface. However, to provide a more positive sealing mechanism, sensor 24 incorporates diaphragms 40 and 42. These diaphragms provide dynamic sealing surfaces having low friction characteristics for translating within cylinder 36, while still effectively sealing piston 34 within cylinder 36. Diaphragms 40 and 42 define a venting chamber 41 and a pressurizing chamber 43 within cylinder 36. Although not drawn, optionally stops may be provided in the cylinder just immediately to the left of diaphragm 42 to restrict movement towards diaphragm 40 when chamber 43 is pressurized.

Also shown in FIG. 3 are orifices which allow fluid communication with cylinder 36. These orifices comprise a bleed orifice 44, a precharge orifice 48 and an actuating orifice 46. The function of these orifices will become apparent upon comprehension of the operation of sensor 24. As shown in FIG. 3, piston 34 is at a fully extended or initial position. The position is one normally occurring when no contact is made with piston 34. In this position bleed orifice 44 maintains an equilibrium between venting chamber 41 and outside atmospheric pressure by communicating fluid across orifice 44.

Similarly, precharge orifice 48 maintains an equilibrium between pressurizing chamber 43 and a regulating pressure source by allowing fluid to flow from the regulated pressure source into pressurizing chamber 43. However, fluid communication can only occur from the regulated pressure source to pressurizing chamber 43 because of a one-way check valve 45 incorporated at precharge orifice 48. Check valve 45 comprises a ball 47 and a spring 49 which traps the ball against seat 50. This arrangement allows fluid at a pressure sufficient to overcome spring 49 to enter chamber 43. Pressure within chamber 43 will tend to drive ball 47 against seat 50 to prevent fluid in chamber 43 from communicating out through check valve 45.

With sensor 24 at this initial position, pressure within cylinder 36 is that of the regulated pressure source. This pressure is also communicated to air bag unit 32 via actuating orifice 46. However, the regulated pressure is controlled so as not to activate air bag unit 32, but instead to provide a threshold of pressure that contact with piston 34 must overcome in order to activate air bag unit 32.

Referring now to FIG. 3a, sensor 24 is depicted with piston 34 in a partially extended or damping position. This position occurs when incidental contact is made with vehicle 22, the incidental contact insufficient to cause piston 34 to generate the pressure necessary to overcome the threshold pressure required to actuate air bag unit 32. Sensor 24, therefore, can be set to absorb varying levels of incidental contact by adjusting the regulated pressure source which in turn adjusts the pressure within cylinder 36. Sensor 24 is set so that contact resulting from a collision below two to three mile per hour does not actuate air bag unit 32. This set point allows for contact which meets the federal government mandate governing minimum contacts that bumpers 21 and 23 of vehicle 22 must absorb without incurring damage.

Upon incidental contact made with vehicle 22, piston 34 moves within cylinder 36. This movement and associated energy is absorbed by spring 38 and resisted by the pressure within chamber 43. Bleed orifice 44 communicates fluid during incidental contact to prevent movement of piston 34 from pressurizing vent chamber 41. After the incidental contact, piston 34 returns to its normally occurring position as depicted in FIG. 3 without incurring any damage.

Referring now to FIG. 3b, substantial contact made with vehicle 22, such as that resulting from a collision, causes piston 34 to translate within 36 and define an actuating position. In this actuating position, piston 34 is retracted within cylinder 36 and spring 38 is compressed. Also, fluid within pressuring chamber 43 is compressed so that a sufficient pressure exists within cylinder 36 to actuate air bag unit 32. As previously discussed, elevated pressures within chamber 43 do not result in fluid communication through precharge orifice 48 because of operation of check valve 45. Instead, fluid within cylinder 36 communicates through actuating orifice 46 to actuate air bag unit 32.

Variations on sensor 24 are also contemplated which employ a piston, a spring and a cylinder, keeping in mind that the essential function of sensor 24 is to absorb energy resulting from incidental contact through an energy absorbing medium, such as a spring, while still providing actuation of air bag unit 32 upon receiving substantial contact. For example, spring 38 can be connected to piston 34 so that spring 38 is external to cylinder 36 while still absorbing incidental contact. With spring 38 external to cylinder 36, no bleed orifice is required as there is no venting chamber.

Figure 4:
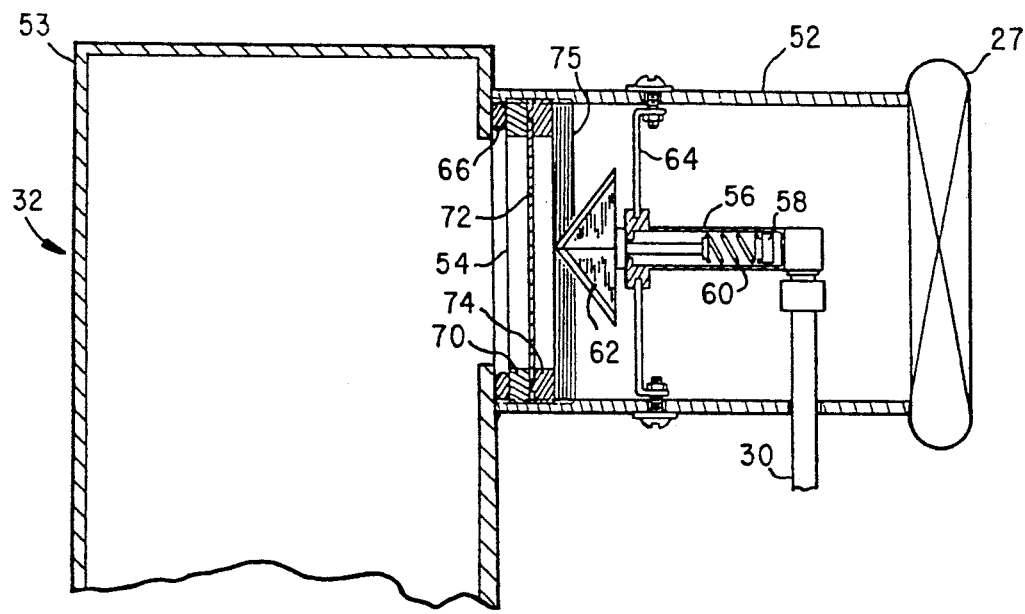
FIG. 4 is a side partial cross-sectional view of an unactuated mechanical cutter with a seal intact.
Figure 4A:
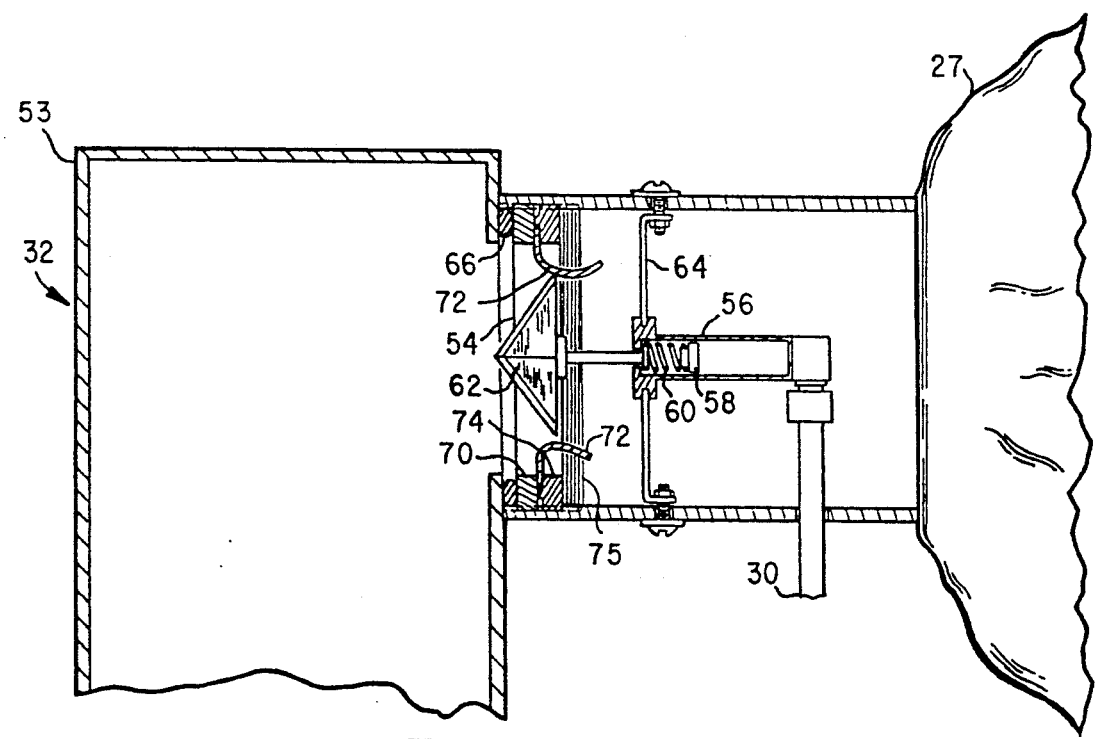
FIG. 4a is a side partial cross-sectional view of an actuated mechanical cutter piercing a seal.

Referring now to FIGS. 4 and 4a, air bag unit 32 is shown comprising an air canister 53 connected to air bag 27. Canister 53 is a source of pressurized fluid for air bag 27 and comprises a container containing fluid pre-pressurized above ambient pressure sufficent to inflate air bag 27. Also containing pre-pressurized fluid within canister 53 is seal 54. Seal 54 comprises a frangible seal fluidally separating canister 53 from air bag 27. Seal 54 is designed to be easily pierced, or otherwise cut while still being sufficiently strong to independently contain the pre-pressurized fluid.

Incorporated in a duct 52 between canister 53 and air bag 27 is a mechanical cutter 56. Mechanical cutter 56 is supported by duct 52 by mounting in a mounting bracket 64 which is fastened to duct 52. Cutter 56 actuates in response to sensor 24 and includes means for advancing a cutting tool 62. Cutter 56 receives fluid communication from sensor 24 through manifold 26 and transmitting line 30.

Cutter 56 comprises a piston 58 and spring 60, similar to sensor 24, as piston means for advancing cutting tool 62. The integrity of seal 54 defines a predetermined pressure at which cutting tool 62 will advance to positively pierce seal 54 and liberate fluid contained within canister 53 so as to inflate air bag 27. Like sensor 24, cutter 56 can also incorporate pressure regulating means or mechanical stop means to resist pressure until a predetermined pressure is exceeded, upon which cutting tool 62 advances to pierce seal 54. Cutter 56 only actuates at pressures above a predetermined pressure. Similar to sensor 24, in response to fluid communication through line 30, spring 60 can absorb energy caused by incidental contact and can also absorb that piston movement generated by the regulated pressure within cylinder 36. Referring to FIG. 4a, mechanical cutter 56 is shown with cutting tool 62 extended through seal 54 in an actuated position, thus piercing seal 54 and allowing fluid to flow through seal 54 into and inflating air bag 27.

Cutting tool 62 preferably has radially ribbed cutting blades with space between the blades, providing thorough cutting by the blades while allowing air flow across the spaces. Cutting tool 62 is also contemplated as comprising a chiseled end which pierces seal 54 or a hammer which strikes the seal, thus reducing the integrity of seal 54 and allowing pressure differential to blow out the seal. The invention also envisions other means to mechanically break, puncture, fracture or otherwise cut the seal.

Figure 5:
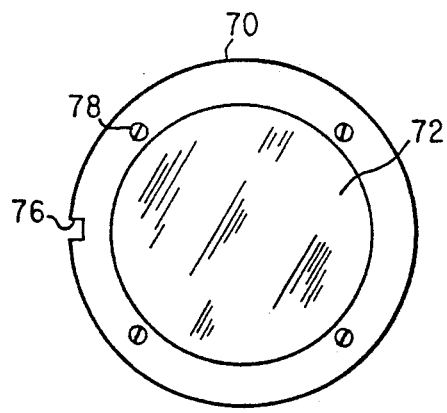
FIG. 5 is a front elevational view of a membrane fastened to a mounting ring.
Figure 6:
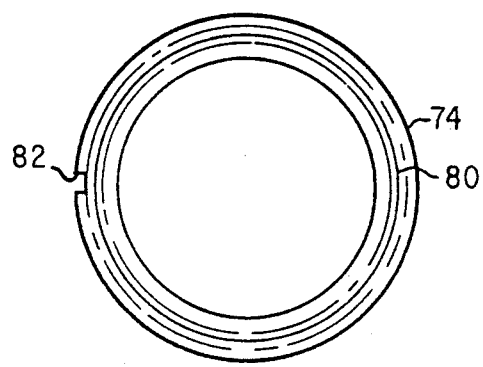
FIG. 6 is a front elevational view of a sealing ring.
Figure 7:
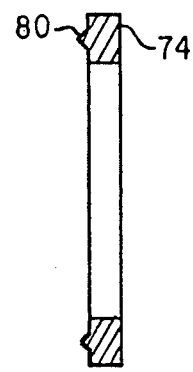
FIG. 7 is a side elevational view of a sealing ring.

Referring now to FIGS. 5, 6 and 7, seal 54 comprises a mounting ring 70 and a sealing ring 74 threaded within duct 52 against O-ring seal 66. Mounting ring 70 is of a malleable material such as brass, and has fastened to it by fasteners 78 a membrane 72 made from 0.003 inch thick brass shim stock. Membrane 72 can be other frangible or puncturable materials at different thicknesses as well, such as 0.001 inch thick steel and 0.125 inch thick glass. As discussed further below, an embodiment using a brittle seal or membrane, such as glass, has favorable results and advantages. To provide additional sealing, sealing ring 74 is employed and has incorporated in one side a circumferential face seal comprising a ridge 80. Ridge 80 is at a radius which seals outside the radius of fasteners 78 against mounting ring 70. Because rings 70 and 74 are externally threaded within internal threads 75 of duct 52, alignment of ring 70 to ring 74 is desired. This alignment is provided by alignment slot 76 of ring 70 and alignment slot 82 of ring 74. When installed, seal 54 provides an effective seal which independently contains the pre-pressurized fluid within canister 53 while still being sufficiently frangible to allow piercing of membrane 72 upon receiving a piercing pressure in excess of a predetermined pressure. By independently containing the pre-pressurized fluid, seal 54 does not require additional means for support to prevent fluid within canister 53 from rupturing seal 54.

Pressurized fluid contained by canister 53 and seal 54 is prevented from circumventing membrane 72 by both O-ring seal 66 and ridge 80. Seal 66 and ridge 80 when installed in duct 52 provide effective full contact seals that also contain the pre-pressurized air within canister 53.

Figure 8:
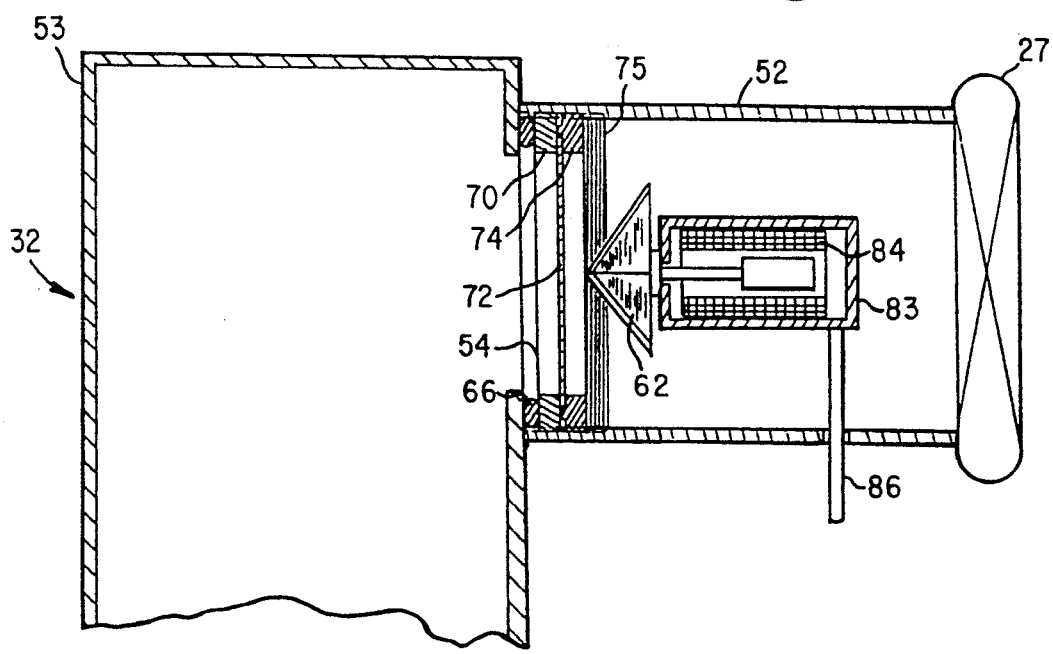
FIG. 8 is a side partial cross-sectional view of an alternate embodiment of the present invention with a mechanical cutter incorporating a solenoid.

Other mechanical piercing means are also envisioned and which also advance in response to sensor 24. For example, referring to FIG. 8 an alternate embodiment is depicted having cutting tool 62 as a moving part of solenoid 83. Solenoid 83 contains solenoid coils 84, which when energized, produce an electromagnetic force which propels cutting tool 62 through membrane 72 of seal 54, thus liberating fluid from canister 53 to inflate air bag 27. Solenoid 83 actuates in response to receiving an electric signal through electric signal conductor 86. Because an electric signal is required to actuate solenoid 83, the alternate embodiment incorporates pressure transducer means for converting pressure communicated by sensor 24 to an electrical signal.

Figure 8A:
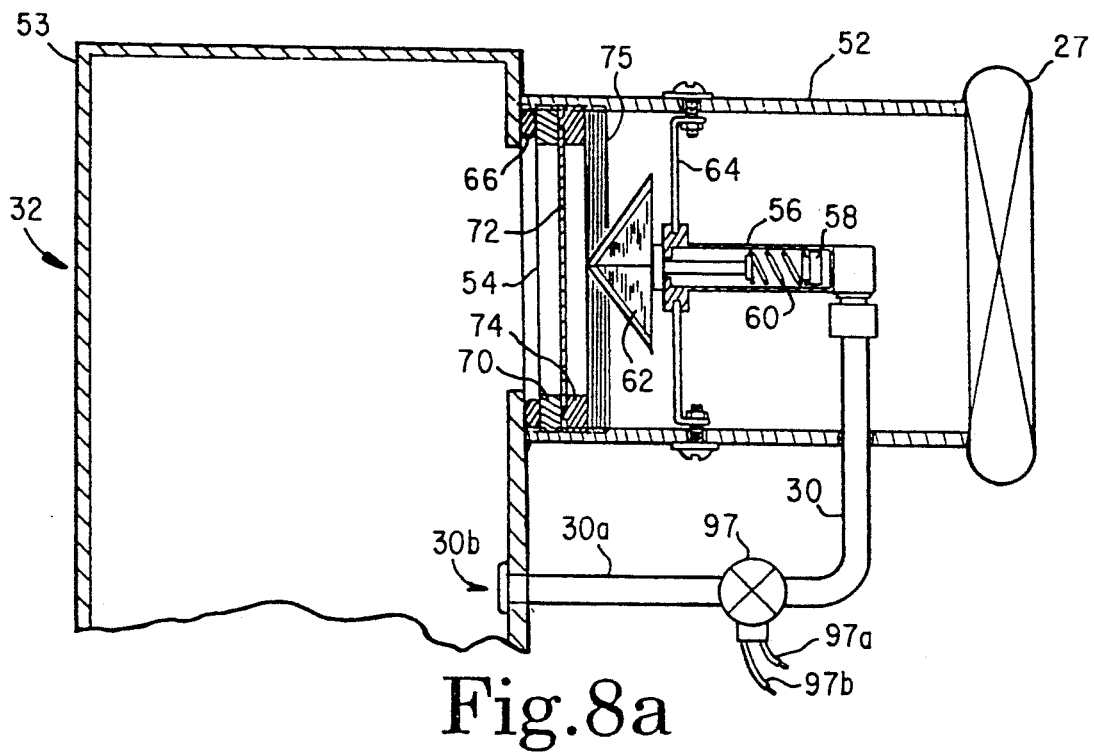
FIG. 8a is a side partial cross-sectional view of another alternate embodiment of the present invention with a mechanical cutter piston actuated by air through a sensor-activated valve.

Another alternative is shown in FIG. 8a. This system is the same as shown and described in FIG. 4 except that line 30 is coupled to canister 53 (via valve 97 and line 30a), instead of being coupled directly to the collision sensor (via the manifold chamber). In this embodiment, piston 58 is driven by air from canister 53 through opening 30b upon fast opening of valve 97. Valve 97 as shown is electrically opened by a signal through wires 97a and 97b. Accordingly, this system may be adapted to collision sensors providing an electric signal.

The connection between sensor 24 and mechanical cutter 56 can either be fluidic, electronic or otherwise, the essential function being that upon sensor 24 receiving substantial contact the system actuates a mechanical cutter to pierce seal 54. The cutter may reciprocate, as illustrated, or may strike, move in an arc, or even constitute a projectile cutter. Also, the cutter mechanism may be located within canister 53 and cut in an outward direction through membrane 72 in the same direction as air flow from the canister.

Figure 9:
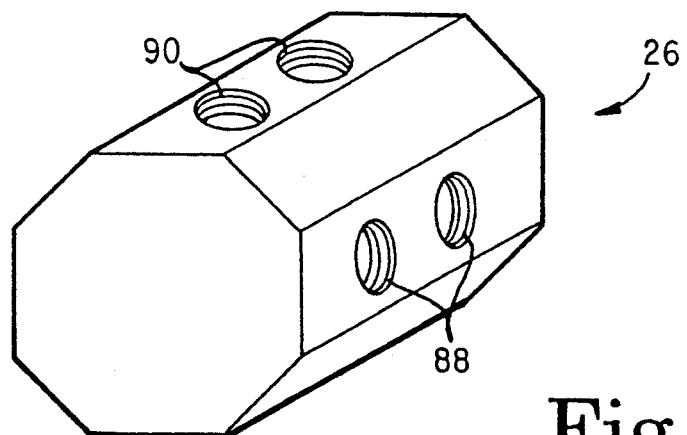
FIG. 9 is a front perspective view of a manifold.

Referring now to FIG. 9, manifold 26 is shown having receiving orifices 88 and transmitting orifices 90. Orifices 88 receive fluid communication from sensor 24, fluid communication including both flow and pressure characteristics of the fluid. In response to one or more sensors transmitting fluid communication indicative of a collision, manifold 26 transmits like fluid communication to one or more mechanical cutters 56. Similarly, in the alternate embodiment manifold 26 transmits fluid communication to pressure transducer means for converting fluid pressure to an electric signal, the signal then being transmitted to a solenoid which activates mechanical cutter 56.

The purpose of manifold 26 is essentially that of a relay in that a plurality of sensors can be connected to manifold 26, any one of the sensors providing fluid communication upon a collision. Upon receiving fluid communication from one or more actuating sensors, manifold 26 then transmits like fluid communication to one or more air bag units. Manifold 26 therefore separates air bag unit 32 from sensor 24 so that the number of sensors is independent of the number of air bag units.

Figure 10:
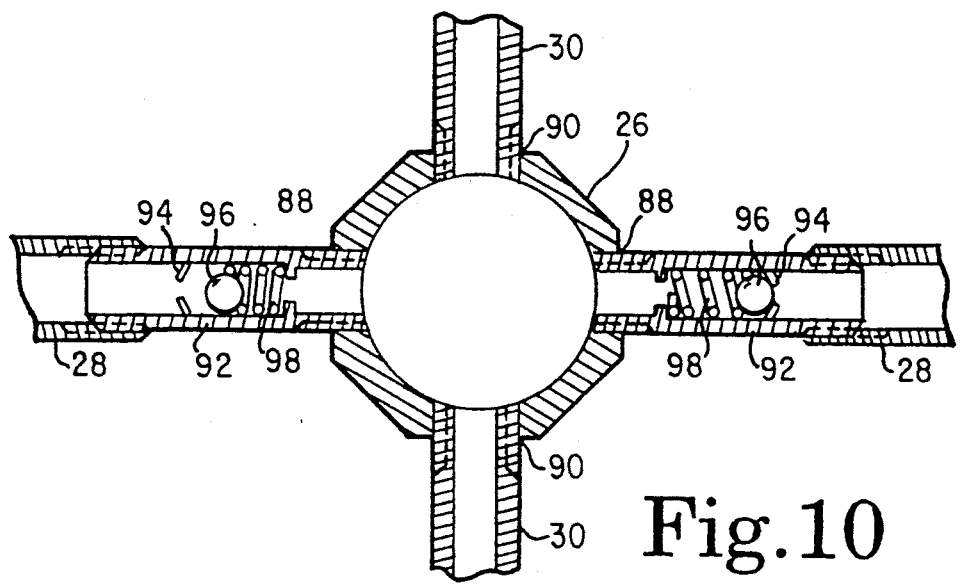
FIG. 10 is a front cross-sectional view of a manifold connected to receiving lines via check valves and connected to transmitting lines.

Referring now to FIG. 10, manifold 26 employs a plurality of one-way check valves 92 corresponding to the plurality of sensors. As shown in FIG. 10, each receiving line 28 has a check valve 92. Check valve 92 is similar to check valve 45 in that it also has a ball 96, a spring 98 and a seat 94. Upon manifold 26 receiving fluid communication from sensor 24 through receiving line 28, ball 96 unseats from seat 94 and allows pressurized fluid to enter manifold 26. The fluid must be at a sufficient pressure to overcome spring 98. Pressures below the predetermined spring pressure will not unseat ball 96 from seat 94 and therefore will not be relayed by manifold 26 to mechanical cutter 56. Once sufficient pressure is generated to unseat ball 96 and allow fluid to flow into manifold 26, the other check valves then prevent fluid within manifold 26 from communicating with other sensors through lines 28. Pressure within manifold 26 tends to drive ball 96 against seat 92 and prevent fluid communication with uncontacted sensors.

Pressurized fluid in manifold 26 then flows to all the air bag units of vehicle 22 fluidally connected to manifold 26. Additionally, more than one sensor can be activated at a time with the only difference being that multiple sources of fluid are received by manifold 26 as opposed to only one.

Also contemplated by this invention is a central location of the source of pressurized fluid, the fluid distributed by a similar manifold to a plurality of air bags. It is to be noted that the term "air bag" used herein not only includes atmospheric air, but also other fluid mediums so long as the fluid can be pressurized sufficiently to inflate an air bag. For example, $CO_2$ (carbon dioxide) can be employed as a fluid, thus providing an inflating medium as well as fire control upon the air bag deflating.

Air bag device 20 can be designed to function over a wide range of operating pressures. Lower pressure fluid sources can provide inflation of the air bags without posing significant sealing considerations. However, low fluid pressures also will decrease air bag inflation times, or decrease the air bag inflation volume given a fixed inflation time. Similarly, air bag inflation times can be varied by adjusting both the pressure of the source fluid and/or the area of the duct feeding the air bag. Pressurized sources of fluid can range beyond hundreds of PSI; however, device 20 employs a pre-pressurized fluid stored in container 53 at 100-250 PSI. Depending upon the pressure of the source fluid and the area of the duct feeding the air bag, device 20 can be adjusted to include a wide range of inflation times in the range of milliseconds by employing fluid pressurized beyond 250 PSI. The invention contemplates pressures beyond 250 PSI in varying configuration of the device 20 as required by the particular application of the invention.

Figure 11A:
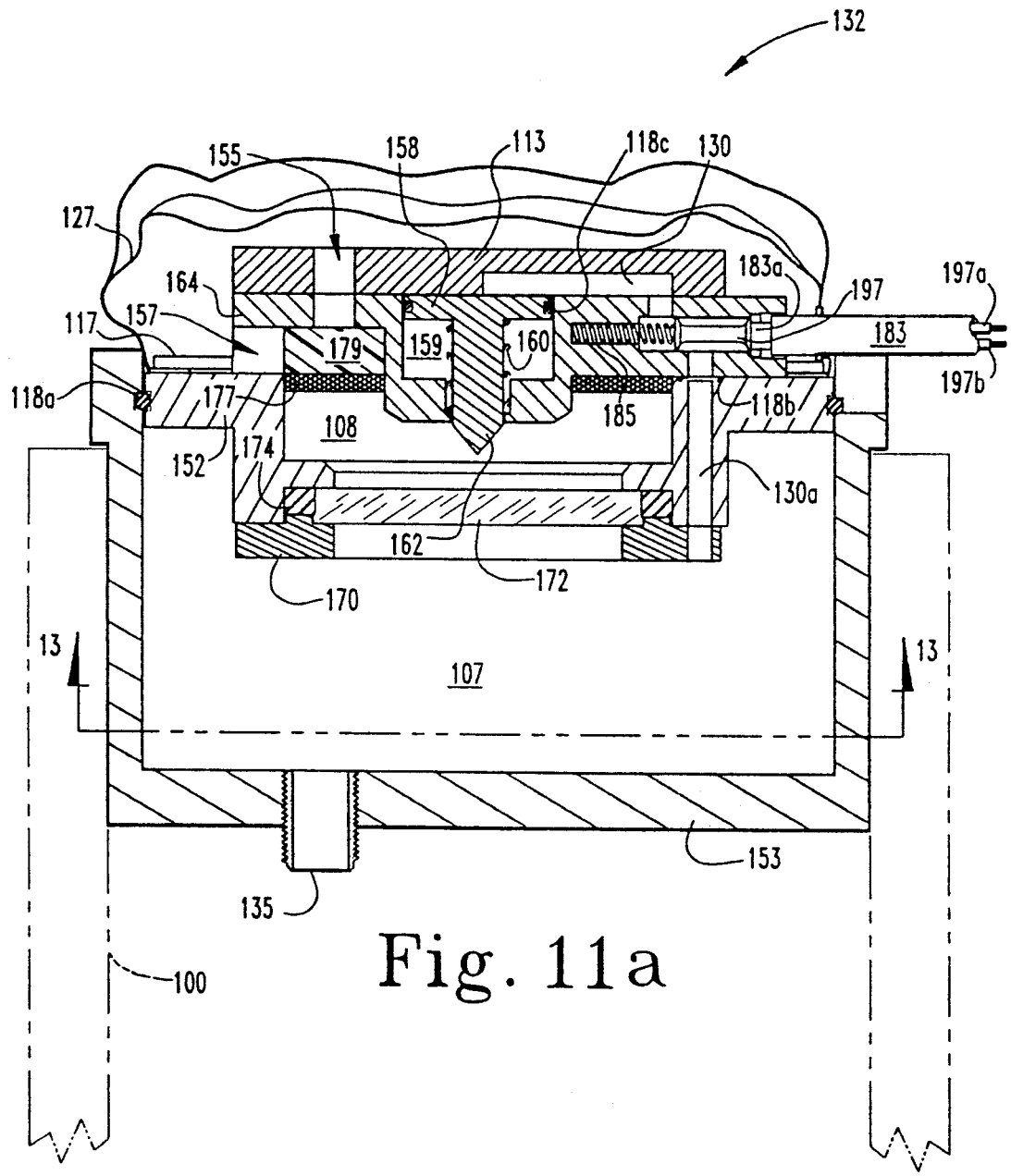
FIG. 11a is a side cross-sectional view of a fourth embodiment of the present invention with a mechanical cutter actuated by air through a sensor-activated valve and with a brittle seal such as glass.
Figure 11B:
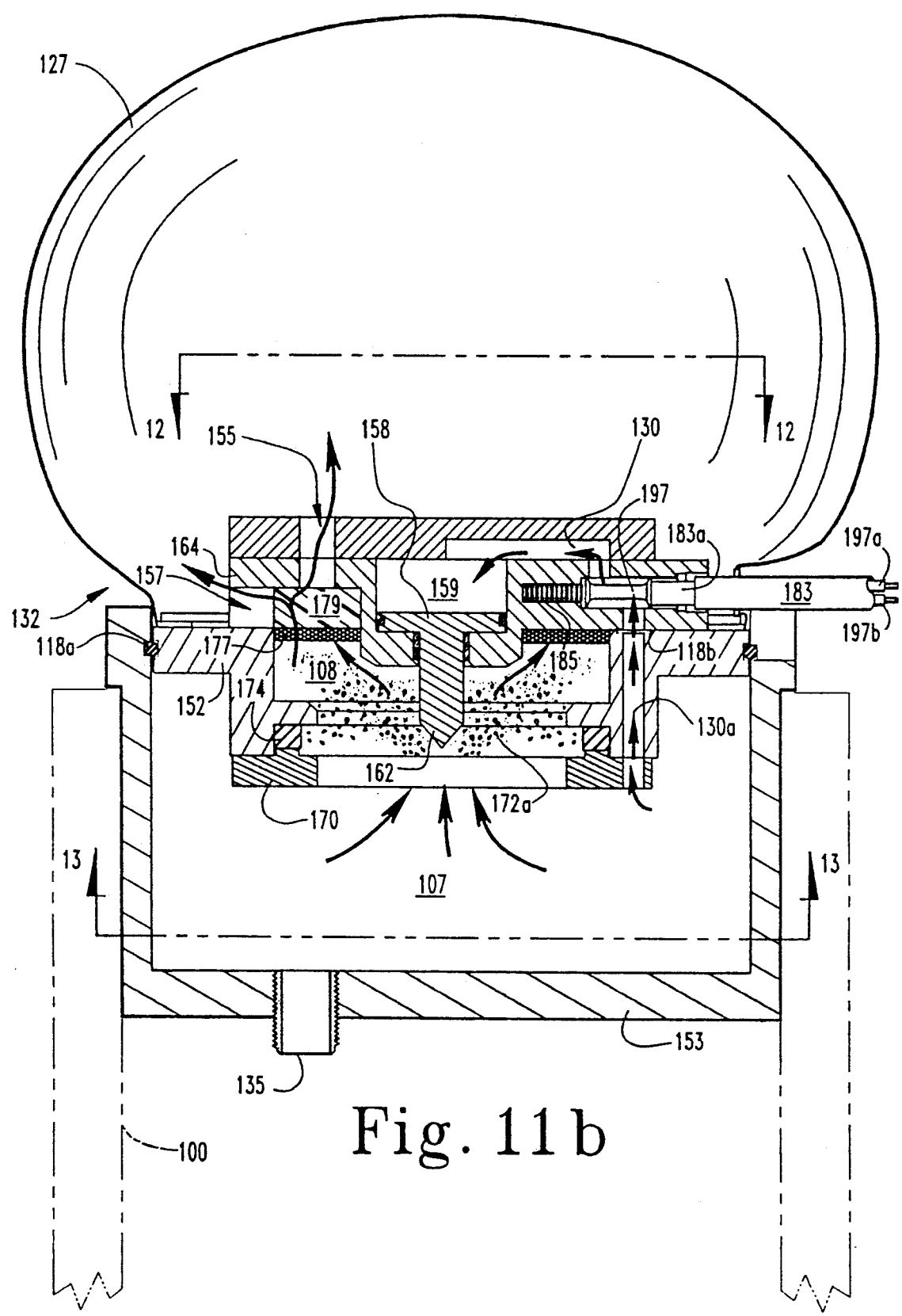
FIG. 11b is a side cross-sectional view of the device of FIG. 11a after the actuated mechanical cutter has cut and shattered the seal to inflate the bag (not drawn to scale).

Referring to FIGS. 11a–11c a fourth embodiment of the present invention is illustrated as air bag unit 132. Unit 132 is analogous to air bag unit 32 previously described and may be located in a multitude of positions within a vehicle and may be activated by any one of a number of type of collision sensing devices as previously described. At its basic level, air bag unit 132 includes air bag 127 coupled to pressurized air canister 153 and separated by a mechanism which cuts membrane or seal 172. Air bag 127 may be of a variety of types of designs, sizes and shapes, and it is believed that a preferred design includes a fabric bag having a rubberized lining. Although canister 153 may be a variety of shapes and sizes, in the illustrated embodiment it is cylindrical in shape and adapted to be mounted in steering column 100 as illustrated in phantom lines.

Seal 172 in the preferred embodiment comprises tempered glass which is sufficiently strong to withstand the pressure differential between high pressure chamber 107 in canister 153 and low pressure chamber 108, free of any movable support or lid. Seal 172 is preferably held in place by compressive forces exerted by elastomeric damper mount 174 which in turn is compressed between an annular boss of seal compressor ring 170 and a lower seat of canister cover 152 (see FIG. 11a). In this way, seal 172, which in this embodiment is a brittle material such as glass or otherwise, is suspended in elastomeric material which dampens vibrations such as mechanical vibrations and sonic vibrations, thereby reducing the risk of accidental fatigue, cracking and failure of seal 172.

Canister cover 152 provides a cover for canister 153 to enclose pressure chamber 107. Cover 152 may be held in place by a variety of mechanical features such as a C-clamp structure (not shown), welding or other attachment. O-ring 118a is provided in the illustrated embodiment to maintain a pressure tight seal in chamber 107. Mounted on canister cover 152 is actuator plate 164, and mounted thereon is transfer plate 113, the three parts being held together in a variety of ways such as circumferentially disposed machine screws such as screws 105 (see FIG. 12) in screwholes 106 (see FIG. 14a).

Cutting tool 162 in this embodiment comprises a cylindrical body with a conical tip, it having been found that forming the conical tip from hardened steel (for example having a Rockwell hardness of 50–52 on the C-scale) provides suitable cutting action to shatter seal 172 upon striking it. Cutting tool 162 reciprocates up and down with piston 158, but as illustrated in FIG. 11a, is biased upwardly by compression spring 160. Duct 130 and 130a, which communicate the upper surface of piston 158 in cylinder 159 with high pressure chamber 107, are shut by a valve, such as spool valve 197. Accordingly, in the configuration of FIG. 11a the pressure in duct 130 (typically ambient) is substantially in equilibrium with the pressure in low pressure chamber 108, and accordingly the piston and cutting tool 162 remain biased upwardly by spring 160, However, upon a signal, such as by sensing a collision, valve 197 is open, thereby communicating high pressure chamber 107 with the top surface of piston 158 through the duct. In the illustrated embodiment this valve is actuated by solenoid 183 moving solenoid plunger 183a radially inward to slide spool valve 197 against the radially outward bias of spring 185, thereby allowing pressurized fluid to flow through the central region of the spool valve into duct 130, as illustrated in FIG. 11b such as by the flow of arrow 130b. In this condition, the pressure in duct 130 and along the top surface of piston 158 exceeds the pressure in low pressure chamber 108 sufficiently to overcome the bias of spring 160 and rapidly moves piston 158 and cutting tool 162 downwardly until the cutting tool strikes membrane 172 to pierce or cut seal or membrane 172. Alternatively the cutting tool may be positioned to strike the seal on the high pressure side of the seal. The valve may be opened by other means such as fluid pressure from a manifold-sensor system, such as previously described. O-ring 118b provides a seal along duct 130a. O-ring 118c provides the seal between piston 158 and cylinder 159. Air bag ring 117 is securely mounted to the remainder of air bag unit 132 with air bag 127 squeezed in compression in between to hold the air bag in place.

As illustrated in FIG. 11b, upon such cutting or striking action, seal 172 is shattered into fragments, such as fragment 172a. Preferably, seal 172 is made of a brittle material, such as glass and preferably tampered glass, which upon sufficient force shatters into fragments. Other brittle materials are envisioned including ceramics, porcelain, brittle alloys mixtures or composites, brittle sintered members, brittle plastics or polymers, or other brittle material, the important feature being that upon being stricken by the cutting tool or otherwise acted upon the brittle seal undergoes extremely rapid crack propagation and shatters into numerous discrete fragments to provide nearly instantaneous disintegration of the seal for extremely rapid liberation of the pressured fluid into the air bag. This provides the advantage of virtually instantaneous opening of the entire orifice previously occupied by the seal, giving extremely rapid, controllable and consistent air flow into the bag. The preferred brittleness is characterized by having the yield stress of the seal substantially equal to the tensile strength of the seal. It also is preferred to have tempered glass or other such amorphous material which has a tendency to exhibit multi-directional rapid crack propagation so as to shatter into numerous small fragments. In this way, seal 172 nearly instantaneously disintegrates, allowing tremendously fast liberation of compressed gas into the air bag. A brittle seal is contemplated in any of the other embodiments described herein.

As stated above, it is preferred that the thickness and shape of seal 172 is sufficient to not require support, such as by a movable gate or lid. Nevertheless, it is to be understood that optionally a support grid, filter or frame structure (not shown) may be provided (such as on the low pressure side of the seal) to provide support while being sufficiently skeletal or porous to allow the seal to shatter and the pressurized gas to be liberated. This option allows for thinner seals, thereby reducing the mass of fragments available to plug the filter and/or flow into the bag.

An additional feature of the present invention is the use of a filter downstream of the seal between the seal and the air bag. In the preferred embodiment, this is shown as a dual filter comprising a sintered brass wire filter 177 and a porous foam 179. It is to be understood that a variety of other filter structures and materials may be used as well. This filter out debris such as fragment 172a (see FIG. 11b) from the shattered seal. The filter further provides the advantage of muffling or dampening sound, a common complaint after deployment of an air bag. Furthermore, the filter may further fragmentize larger fragments of the shattered seal so that any fragments of the seal entering air bag 127 are sufficiently small to not pose a meaningful risk of rupturing or penetrating through air bag 127. In the preferred embodiment, sintered brass wire filter 177 is doughnut-shaped and nested adjacent to styrofoam material filter 179 in an annular channel of actuator plate 164 surrounding cylinder 159. Air flows from high pressure chamber 107 through the filters and through a plurality of axial vents 155 and/or radial vents 157 into air bag 127. Preferably these axial and radial vents and circumferentially disposed substantially around the entire mechanism to allow sufficient cross-sectional area for rapid liberation of pressurized fluid.

Preferably, seal 172 and its mounted opening should be sufficiently large in cross-sectional area to likewise allow rapid liberation of pressurized fluid without undue constriction. In the preferred embodiment, seal 172 is disc-shaped having a thickness of 0.375 inches and a diameter of 1.8 inches. It is envisioned that canister 153 will be maintained with approximately 1,100 to 1,200 PSI pressure, although as stated before, pressure may be higher or lower depending on design criteria including the size of the bag to be inflated, timing considerations, the volume of chamber 107 and airflow frictional considerations. Also, the porosity of the filters and the area of the filters, the seals and the vents may be enlarged, decreased or altered to vary the air flow speed according to design criteria. The pressure may be upwards of 2,000 or 3,000 PSI if necessary. In the preferred embodiment, canister 153 has an inside diameter of 4.625 inches and a depth of about three inches. Other sizes and shapes may be used as well. Canister 153 may be initially pressurized by pressurized fluid from line 135. The preferred embodiment, fill line 135 includes a shut-off valve and a pressure gauge (not shown) maintaining pressurized chamber 107 as an independent closed chamber. The gauge provides assurance that the system is pressurized. Alternatively, chamber 107 may be communicated with outside pressure source. Similarly, although preferably duct 130 communicates with high pressure chamber 107, alternatively it may be coupled to an outside pressure source such as disclosed with line 30 illustrated in FIG. 4. Other means for shattering the seal or actuating cutting tool 162 may be utilized instead of a pressure actuated piston system as illustrated, such as a direct solenoid actuation, compression spring drive cutter, inertia actuation or other such system. Furthermore, in the context of the brittle membrane or seal 172, although a striking action from a cutting tool is preferred, it is possible to initiate crack propagation of the brittle material by an initial detonation, such as a blasting cap or the like, which is not sufficient to inflate the air bag but is sufficient to initiate shattering of seal 172 and such device is within the term cutter as set forth as the invention. Such device would be embedded in or placed in proximity or in contact with seal 172. Other cutting, shattering techniques may be used including shock wave or sound wave initiated shattering.

Figure 12:
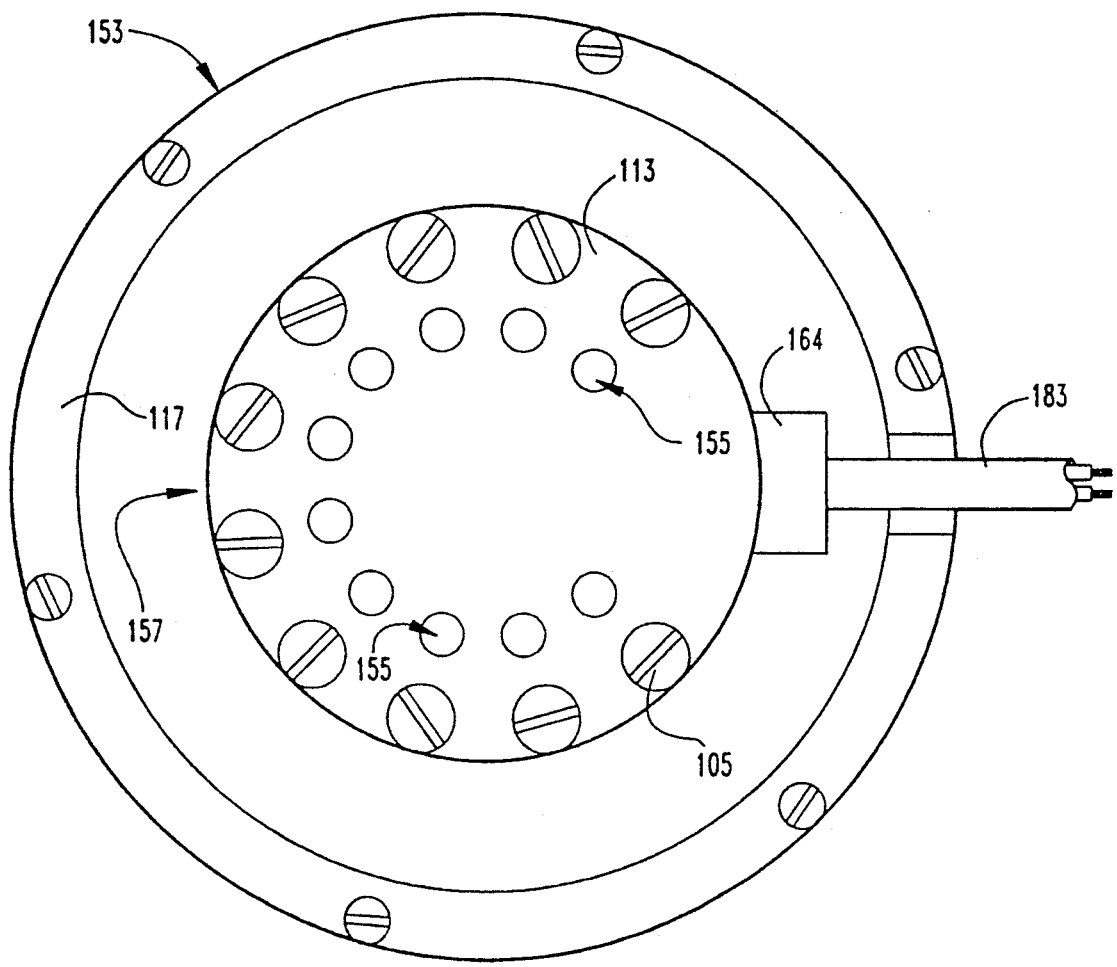
FIG. 12 is a frontal view of the fourth embodiment taken along line 12—12 of FIG. 11b.

FIG. 12 shows a frontal view of the device as viewed from inside of the air bag. Axial vents 155 are illustrated with radial vents 157 in alignment therewith. Plate 113 is secured in place with screws to actuator plate 164 and canister cover 152. Actuator plate 164 has a radial portion better illustrated in FIGS. 14a and 14c which includes a threaded solenoid hole 184 for mounting solenoid 183 therein. Solenoid is activated by current provided from a signal through wires 197a and 197b.

Figure 13:
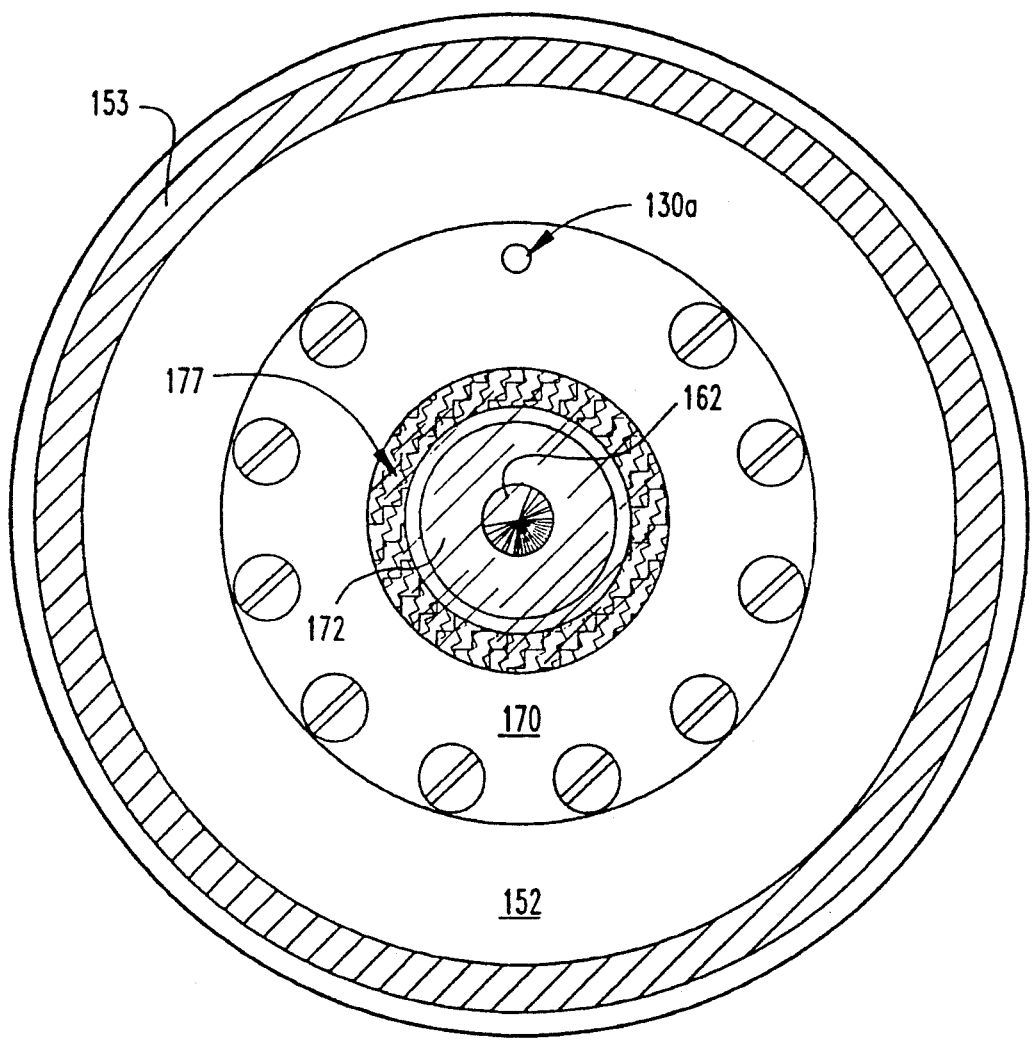

FIG. 13 shows a cross-sectional view looking at brittle seal 172 which, in the embodiment, is transparent tempered glass through which cutting tool 162 and filter 177 may be seen. Seal 172 is held to cover plate 152 by ring 170 and the elastomeric member 174 (not shown).

Figure 14A:
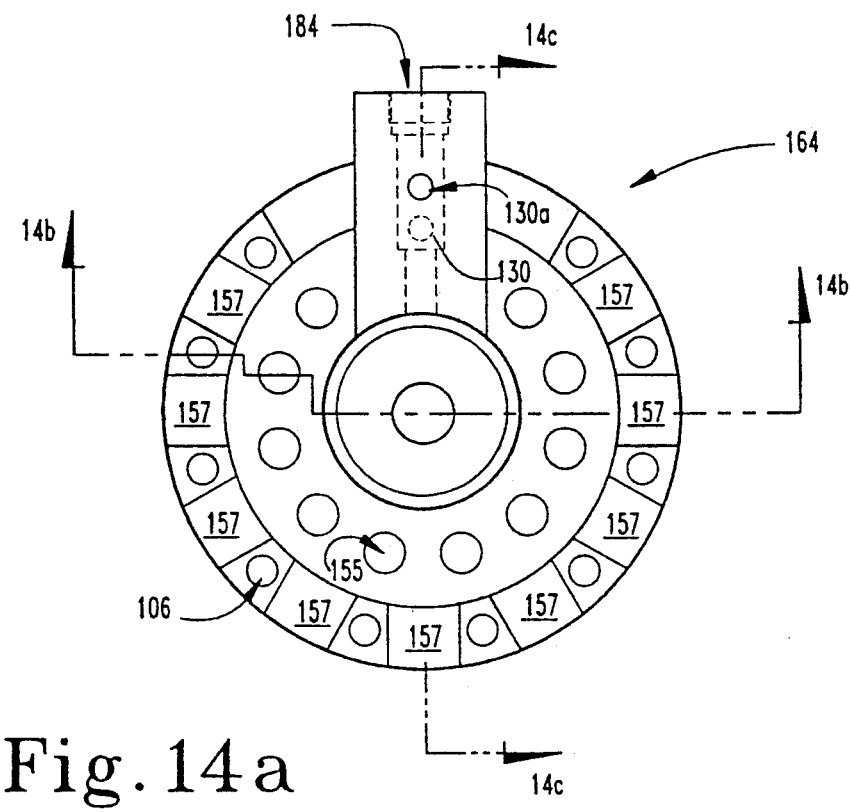
FIG. 14a is a bottom view of the actuator plate used in the device of FIG. 11a shown in isolation for drawing clarity.
Figure 14B:
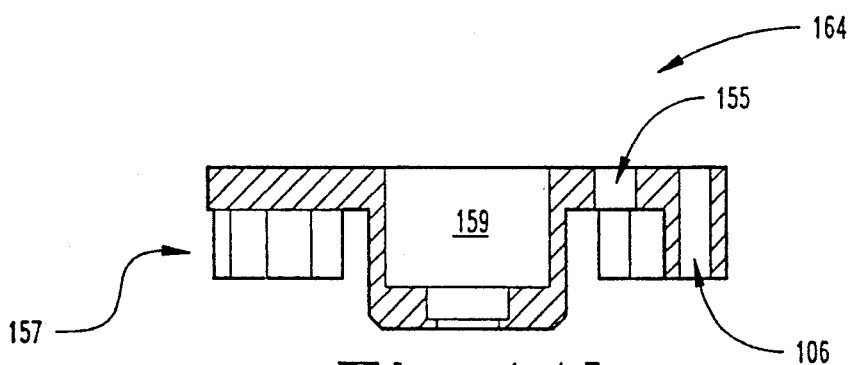
Figure 14C:
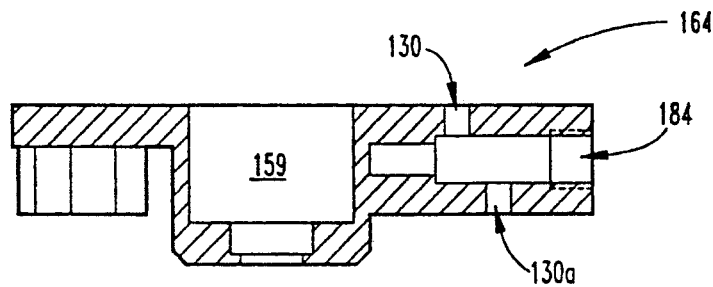

FIGS. 14a, 14b and 14c show actuator plate 164 in isolation due to its particular configuration in this embodiment, having radial vents 157 and axial vents 155 along with screw holes 106. The central most aperture is the aperture through which the cutting tool moves to strike the seal. Due to the presence of the radial projection defining solenoid hole 184, although the sintered brass seal is doughnut-shaped all the way around the structure, the foam seal 179 is C-shaped and nest down in the annular channel substantially coplanar with hole 184.

The method of operation of the present device is substantially set forth above and includes providing the structure described and shattering the brittle seal into fragments, thereby allowing fluid flow from the force of pressurized fluid 107 to inflate air bag 127. This method further includes filtering, such as by filters 177 and/or 179, of fragments out of the fluid flow.

It is desirable to have the overall air bag and sensor system independent from the other systems of the vehicle. This allows operation of the present invention regardless of the operability of other vehicle systems during a collision.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. For use in a vehicle having collision sensing means mounted thereon to rapidly generate a signal in response to a collision, cushioning apparatus to be mounted in said vehicle and deployed upon collision to protect an occupant in said vehicle from injury, said cushioning apparatus comprising:
   (a) a reservoir containing prior to collision a pressurized fluid and having an outlet,
   (b) an inflatable cushion having an inlet, said inflatable cushion being inflated solely by said pressurized fluid from said reservoir in the event of a collision, (c) a frangible plate interposed between the outlet of said reservoir and the inlet of said inflatable cushion and preventing the passage of pressurized fluid from said reservoir to said inflatable cushion, said frangible plate having an upstream side facing the outlet of said reservoir and a downstream side opposite said upstream side, said frangible plate rapidly shattering into discrete fragments when struck, (d) first means to support said frangible plate around the periphery thereof so as to leave the major central area of said frangible plate unobstructed, (e) a striking member adjacent the downstream side of said frangible plate and having a longitudinal axis, a first end to strike said frangible plate and rapidly shatter said frangible plate, a second end opposite said first end, and a transverse cross-section substantially smaller than the major central area of said frangible plate, (f) second means mounting said striking member for movement along said longitudinal axis toward the downstream side of said frangible plate, (g) third means to rapidly apply a force to the second end of said striking member in response to a signal generated by said collision sensing means to drive said striking member along said longitudinal axis toward the downstream side of said frangible plate so that the first end of said striking member shatters said frangible plate, (h) whereby to provide a passage generally annularly disposed about said striking member and of area adequate to permit the rapid flow therethrough of said pressurized fluid from said reservoir into said inflatable cushion in response to a signal generated by said collision sensing means, said pressurized fluid being the sole fluid to inflate said cushion, (i) filter means mounted in said passage and generally annularly disposed about said striking member and interposed between said frangible plate and the inlet of said inflatable cushion.

2. Cushioning apparatus as in claim 1, wherein the first end of said striking member shatters the entire central area of said frangible plate inwardly of said first means.

3. Cushioning apparatus as in claim 1, wherein:
(j) said third means applies fluid pressure to the second end of said striking member.

4. Cushioning apparatus as in claim 1, wherein:
(j) the transverse cross-sectional area of the second end of said striking member is greater than the transverse cross-sectional area of the first end of said striking member,
(k) said third means applies fluid pressure to the second end of said striking member.

5. Cushioning apparatus as in claim 1, wherein said pressurized fluid is air or carbon dioxide.

6. Cushioning apparatus as in claim 1, wherein said third means comprises:
(j) fluid conduit means communicating between said reservoir and the second end of said striking member,
(k) valve means operatively interposed in said fluid conduit means and rapidly opening upon receiving a signal from said collision sensing means,
(l) whereby to permit the rapid application of pressure from the reservoir to the second end of said striking member to advance the first end of said striking member to shatter said frangible plate and inflate said cushion.

7. Apparatus as in claim 1, wherein said frangible plate is glass, tempered glass, ceramic, brittle alloys, brittle sintered material or brittle polymeric materials.

8. Apparatus as in claim 1, wherein the first end of said striking member strikes the center of the downstream side of said frangible plate.

9. Apparatus as in claim 1, wherein the first end of said striking member is tapered substantially to a point.

10. Cushioning apparatus as in claim 1, wherein the inlet of said inflatable cushion is substantially aligned with the outlet of said reservoir.

11. Cushioning apparatus as in claim 1, wherein said third means comprises:
(j) valve means having an inlet communicating with a source of pressurized fluid and an outlet communicating with the second end of said striking member,
(k) said valve means rapidly opening upon receiving a signal from said collision sensing means,
(l) whereby to permit the rapid application of pressure from said source of pressurized fluid to the second end of said striking member to advance the first end of said striking member to shatter said frangible plate and inflate said cushion.

12. Cushioning apparatus to be mounted in a vehicle and deployed upon collision to protect an occupant in the vehicle from injury, said cushioning apparatus comprising:

(a) a reservoir containing prior to collision a pressurized fluid and having an outlet, (b) an inflatable cushion having an inlet, said inflatable cushion being inflated solely by said pressurized fluid from said reservoir in the event of a collision, (c) a frangible plate interposed between the outlet of said reservoir and the inlet of said inflatable cushion and preventing the passage of pressurized fluid from said reservoir to said inflatable cushion, said frangible plate having an upstream side facing the inlet of said reservoir and a downstream side opposite said upstream side, said frangible plate rapidly shattering into discrete fragments when struck, (d) first means to support said frangible plate around the periphery thereof so as to leave the major central area of said frangible plate unobstructed, (e) a striking member adjacent the downstream side of said frangible plate and having a longitudinal axis, a first end to strike said frangible plate and rapidly shatter said frangible plate, a second end opposite said first end, and a transverse cross-section substantially smaller than the major central area of said frangible plate, (f) second means mounting said striking member for movement along said longitudinal axis toward the downstream side of said frangible plate, (g) collision sensing means to be mounted on said vehicle and to rapidly generate a signal in response to a collision, (h) third means to rapidly apply a force to the second end of said striking member in response to a signal generated by said collision sensing means to drive said striking member along said longitudinal axis toward the downstream side of said frangible plate so that the first end of said striking member shatters said frangible plate, (i) whereby to provide a passage generally annularly disposed about said striking member and of area adequate to permit the rapid flow therethrough of said pressurized fluid, said pressurized fluid being the sole fluid to inflate said cushion, (j) filter means mounted in said passage and generally annularly disposed about said striking member and interposed between said frangible plate and the inlet of said inflatable cushion.

13. Cushioning apparatus as in claim 12, wherein the first end of said striking member shatters the entire central area of said frangible plate inwardly of said first means.

14. Cushioning apparatus as in claim 12, wherein:
(k) said third means applies fluid pressure to the second end of said striking member.

15. Cushioning apparatus as in claim 1, wherein:
(k) the transverse cross-sectional area of the second end of said striking member is greater than the transverse cross-sectional area of the first end of said striking member,
(l) said third means applies fluid pressure to the second end of said striking member.

16. Cushioning apparatus as in claim 12, wherein said pressurized fluid is air or carbon dioxide.

17. Cushioning apparatus as in claim 12, wherein said third means comprises:
(k) fluid conduit means communicating between said reservoir and the second end of said striking member,
(l) valve means operatively interposed in said fluid conduit means rapidly opening upon receiving a signal from said collision sensing means,
(m) whereby to permit the rapid application of pressure from the reservoir to the second end of said striking member to advance the first end of said striking member to shatter said frangible plate and inflate said cushion.

18. Apparatus as in claim 12, wherein said frangible plate is glass, tempered glass, ceramic, brittle alloys, brittle sintered materials or brittle polymeric materials.

19. Apparatus as in claim 12 wherein the first end of said striking member strikes the center of the downstream side of said frangible plate.

20. Apparatus as in claim 12, wherein the first end of said striking means is tapered substantially to a point.

21. Cushioning apparatus as in claim 12, wherein the inlet of said inflatable cushion is substantially aligned with the outlet of said reservoir.

22. Cushioning apparatus to be mounted in a vehicle and deployed upon collision to protect an occupant in the vehicle from injury, said cushioning apparatus comprising:
(a) a reservoir containing pressurized fluid and having an outlet, said fluid being pressurized prior to a collision,
(b) an inflatable cushion having an inlet substantially aligned with the outlet of said reservoir, said inflatable cushion being inflated solely by said pressurized fluid from said reservoir in the event of a collision,
(c) a passageway interposed between the outlet of said reservoir and the inlet of said inflatable cushion to conduct pressurized fluid from said reservoir to said inflatable cushion,
(d) a frangible plate in said passageway interposed between the outlet of said reservoir and the inlet of said inflatable cushion and preventing the passage of pressurized fluid from said reservoir to said inflatable cushion, said frangible plate having an upstream side facing the outlet of said reservoir and a downstream side facing the inlet of said inflatable cushion, said frangible plate rapidly shattering when struck,
(e) said frangible plate is glass, tempered glass, ceramic, brittle alloys, brittle sintered materials or brittle polymeric materials,
(f) first means to support said frangible plate only around the periphery thereof so as to leave the major central area of said frangible plate totally unobstructed,
(g) a striking member of hardened steel interposed between the downstream side of said frangible plate and the inlet of said inflatable cushion, said striking member having a longitudinal axis, a pointed first end to strike the downstream side of said frangible plate and rapidly shatter said frangible plate, a second end with enlarged face opposite said first end, and a transverse cross-section substantially smaller than the major central area of said frangible plate,
(h) second means mounting said striking member for movement along its longitudinal axis toward the center of the downstream side of said frangible plate,
(i) collision sensing means to be mounted on said vehicle and to rapidly generate a signal in response to a collision,
(j) third means to rapidly apply fluid pressure to the enlarged face on the second end of said striking member in response to a signal generated by said collision sensing means to drive said striking member toward the downstream side of said frangible plate so that the pointed first end of said striking member completely shatters the entire central area of said frangible plate inwardly of said first means,
(k) whereby to provide a passage generally annularly disposed about said striking member and of area adequate to permit the rapid flow therethrough of pressurized fluid from said reservoir into said inflatable cushion in response to a signal generated by said collision sensing means, said pressurized fluid being the sole fluid to inflate said cushion.
(l) filter means mounted in said passageway and generally annularly disposed about said striking member and interposed between said frangible plate and the inlet of said inflatable cushion.

23. Cushioning apparatus as in claim 22, wherein said pressurized fluid is air or carbon dioxide.

24. Cushioning apparatus as in claim 12, wherein said third means comprises:
(k) valve means having an inlet communicating with a source of pressurized fluid and an outlet communicating with the second end of said striking member,
(l) said valve means rapidly opening upon receiving a signal from said collision sensing means,
(m) whereby to permit the rapid application of pressure from said source of pressurized fluid to the second end of said striking member to advance the first end of said striking member to shatter said frangible plate and inflate said cushion.

* * * * *

UNITED STATES PATENT AND TRADEMARK OFFICE
CERTIFICATE OF CORRECTION

PATENT NO. : 5,152,550
DATED : October 6, 1992
INVENTOR(S) : Larry D. Hoagland and Stephen J. Brockman It is certified that error appears in the above-identified patent and that said Letters Patent is hereby corrected as shown below:

Column 10, line 39, before "glass" delete "tampered" and substitute therefor --tempered--.

Column 11, line 24, after "to", delete "styrofoam" and substitute therefor --STYROFOAM--.

Signed and Sealed this

Fifteenth Day of December, 1992

Attest:

DOUGLAS B. COMER

Attesting Officer

Acting Commissioner of Patents and Trademarks